June 13, 1967 — A. E. REVELL — 3,324,633
AIR FILTER CONTROL
Filed June 22, 1964
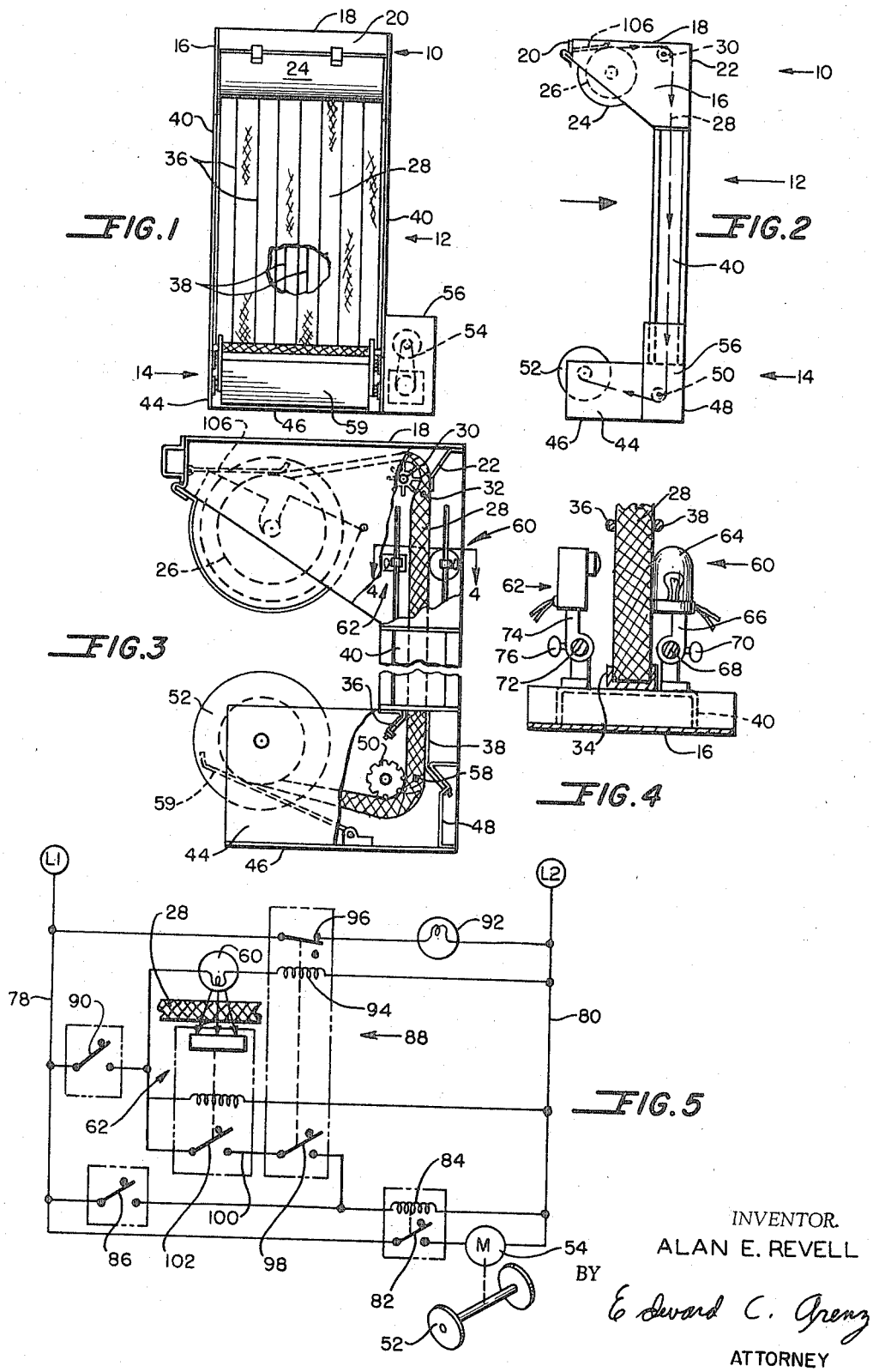
INVENTOR.
ALAN E. REVELL
BY
Edward C. Grenz
ATTORNEY

3,324,633
AIR FILTER CONTROL
Alan E. Revell, Louisville, Ky., assignor to American Air Filter Company, Inc., Louisville, Ky., a corporation of Delaware
Filed June 22, 1964, Ser. No. 376,644
3 Claims. (Cl. 55—274)

This invention relates to an arrangement for controlling the advance of air filter material in automatic roll-type air filters.

One known way to control the advance of the air filter curtain in automatic air filters is to use the variations in the static pressure differential between opposite sides of the filter curtain to indicate the need to advance clean filter material into the air stream. Another known way to control the amount of clean filter material advanced into an air stream is to advance increments of filter curtain into the air stream at predetermined intervals, with the determination of the intervals being based upon the estimated rate that the filter curtain will capture contaminants and dirt from the air stream. In this latter way, if the estimate of the rate that dirt will be collected in the filter curtain is reasonably accurate the usage of the filter medium will be at a generally economical rate. There may even be a fair correlation between the variations in static pressure differential and the advance of the filter curtain even though the advance of the filter curtain is in fact independent of any measured static pressure differential. Other known ways include combinations which use both a static pressure differential variation and a time-measure element in an attempt to gain the best of the two ways.

This invention deals with an alternate way of controlling the advance of a filter curtain. In accordance with this invention the underlying concept is that variations in the light-transmitting character of a filter curtain which passes light may be used as the key to the need for advancing additional clean filter material into the air stream. The basis for this concept is that the light-transmitting character of such a filter curtain will vary, within limits, in accordance with the quantity of contaminants or dirt caught by the filter curtain. Specifically, the greater the amount of dirt captured by the filter curtain, the greater the reduction in light transmission through the curtain; and conversely, the less dirt captured, the less the reduction in light transmission.

In the drawing:

FIGURE 1 is a front elevational view of a commercially available automatic roll-type air filter which usually uses a glass fiber filter curtain;

FIGURE 2 is a side view of the air filter of FIGURE 1 with the path of filter medium advance from a supply zone through an air flow zone to a discharge zone indicated;

FIGURE 3 is a partly broken side view illustrating certain details of such an air filter incorporating the invention;

FIGURE 4 is a fragmentary, horizontal sectional view corresponding to one taken along the line 4—4 of FIGURE 3; and FIGURE 5 is an electrical circuit diagram.

One filtering material which is widely used in automatic air filters of the type to which the invention is applicable is a glass fiber web of nominal two to three inch thickness. A substantial length of this material is, in accordance with the disclosure of U.S. Patent 2,807,330, usually supplied in the form of a roll having the material in compressed condition on a spool in the supply zone of the filter. The material is passed from the supply zone, through an air filtering zone in a resiliently expanded condition, and is then recompressed upon another spool in the discharge zone.

With a filter apparatus of this general character in mind as an example and referring to FIGURES 1–2, the filter generally includes the supply zone 10, the air flow zone 12 through which the filter medium is advanced in its operatively expanded condition, and the discharge zone 14 into which the dirtied filter material is fed for winding up into a relatively tight roll permitting convenient disposal thereof. Air flow through the filter apparatus in a front-to-rear direction is indicated by the arrow of FIGURE 2.

The supply zone 10 (FIGURES 1–3) is formed by a pair of generally triangular-shaped sidewall portions 16, a top wall 18, a front wall 20, a stub rear wall 22, and a semi-cylindrical, trough-shaped front cover 24 pivotally supported along its lower rear edge by the sidewalls and adapted to receive the supply spool 26 of filter medium which is carried therewithin in nesting relationship. The spool has a supply of filter material 28 of the character mentioned tightly wound thereupon, the spool being disposed within the cover so that when the filter medium is advanced it passes from the upper side of the spool over a fluted idler roller 30 which extends transversely across a supply zone and is spaced slightly below the top wall. The roller is mounted so that it rotates as the filter medium is advanced around it and down into the air flow zone.

As the filter medium passes around the idler roller 30 it advances into the air flow zone 12 through the generally rectangular entry aperture 32 defined along the rear by the downwardly-directed lower edge of the stub rear wall 22, along the front by the roller 30, and at the sides by the upper ends of the inwardly-open edge seal channels 34 which receive the vertical edges of the filter medium as it enters the air flow zone.

The front and rear faces of the filter curtain 28 in the air flow zone are retained against displacement in either a front or rear direction by vertically extending front and rear wires 36 and 38. These wires are secured at their top ends to structure in the supply zone 10, and at their bottom ends to structure in the discharge zone 14.

The vertical edges of the air flow zone are framed along the height of the air flow zone by the vertical frame members 40 secured at their upper ends to the lower ends of the supply zone sidewalls 16, and at their lower ends to the discharge zone structure. The inner face of each frame member carries the inwardly-open channels 34 serving as the vertical edge seals for the filter material.

The discharge zone 14 structure includes a pair of rectangular sidewalls 44, a bottom wall 46, a rear wall 48, a transversely-disposed reel 50 supported at its ends from the sidewalls 44 and spaced slightly forward of the rear wall 48, and a filter medium rewind spool 52 which also has its ends mounted on the sidewalls 44. The rewind spool is driven by an electric motor and gear reducer arrangement 54 located within the casing 56.

The dirtied filter medium exits from the air flow zone 12 by passing through the exit aperture 48 defined between the rear surface of the reel 50 and the rear wall 48. It then passes forwardly over a pressure plate 59 to the core of the rewind spool 52 where it is wound upon the core in a compressed condition.

Additional details of structure of this exemplary filter apparatus are disclosed in U.S. Patents 3,007,651 and 3,013,630.

The advance of the filter medium into, through, and out of the air stream is effected by energizing the motor 54 to cause rotation of the rewind spool 52. Energization of the motor is controlled in accordance with the detected light-transmitting quality of the filter curtain 28 in a selected area in the air stream. To measure this light-transmitting quality a light source 60 and light-detecting means 62 are provided in the upper part of the air flow zone adjacent the entry aperture 32 through which filter material is advanced into the air stream.

Referring now to the upper part of FIGURE 3 and to FIGURE 4, the light source 60 as presently preferred takes the form of a 125 volt, 116 watt traffic signal lamp such as is commercially available from the General Electric Company. It is located within a transparent shield in the form of a glass globe 64 mounted on a socket fixture 66 which is in turn adjustably supported for movement in a vertical direction along the rear face of the filter curtain upon a vertically-extending bar 68. A thumb screw 70 is provided for conveniently securing the light source assembly at the desired height after its adjustment.

The light-detecting means 62 is preferably located on the upstream side of the filter curtain and generally opposite the light source as shown in FIGURES 3 and 4. It takes the form of a photoelectric relay of either the adjustable type, such as is commercially available from General Electric Company as their type C402G200, or of the non-adjustable type such as the commercially available Sigma type 8RS01D available from Sigma Instruments, Inc. The adjustable and non-adjustable aspect of such photoelectric relay relates to means for reducing the amount of light received by the cell within the relay casing, this conventionally being done by adjusting the size of the opening through which light is received by the cell.

As with the light source, it is preferable that the light-detecting means 62 be mounted to permit independent vertical positioning, and to this end the fixture 74 is slidably mounted upon the vertically-extending bar 72 and a securing thumb screw 76 is provided.

An example of a presently preferred control circuit incorporating the light source and light-detecting means is shown in FIGURE 5.

The lines 78 and 80 are connected to a source of electrical power through power switches and fuses which are not shown. A completed circuit energizing the rewind spool drive motor 54 results when the switch 82 of a control relay closes due to energization of the control relay coil 84. As shown, the switch 82 of the control relay is normally open so that the drive motor 54 for the air filter is normally de-energized and the filter curtain is stationary. A normally-open switch 86 is provided in series with the control relay coil 84 to permit manual energization of the drive motor for loading and unloading purposes.

The other principal elements shown in the FIGURE 5 circuit include the lamp 60, the light-detecting means generally designated 62, a current-sensitive relay generally designated 88, a filter material run-out switch designated 90 and a warning lamp 92. The current-sensitive relay 88 includes a coil 94 in series with the lamp 60, and two single pole, single throw switches 96 and 98 controlled in accordance with current flow through the coil 94. While current flows through the coil 94, the switch 96 in series with the warning lamp 92 is maintained in an open position, and the switch 98 in series with the control relay coil 84 is maintained in a closed position. The switch 98 is connected in series through line 100 with switch 102 of the photoelectric relay 62. Switch 102 is maintained in an open position in response to a level of light received by the photoelectric relay equaling or exceeding a predetermined value and operates to a closed position upon a reduction of such light below that value.

The purpose of the run-out switch 90 is to prevent further automatic movement of the filter curtain when the supply of filter medium is exhausted. When the depth of the filter medium on the supply spool is reduced to a given value, the run-out switch actuating arm 106 (FIGURE 3) which bears toward the core of the supply roll actuates the run-out switch 90 to an open position and prevents further automatic advance of filter medium by opening one of the parallel circuits to the control relay coil.

The operation of the apparatus under normal conditions will now be briefly considered. A new roll of filter material is installed by mounting it in the supply zone and threading the leading end through the entrance aperture 32 and into the air flow zone, through the exit aperture 58 and around the reel 50 onto the core of the rewind spool 52. The motor 54 is energized by holding the manual switch 86 closed long enough to wind one or two turns of material upon the core of the rewind spool. With a new roll of filter material the run-out switch 90 is in a closed position due to the arm 106 (FIGURE 3) being in an upwardly pressed position. With switch 90 closed, and with clean filter material disposed between the light source and detecting means, current flows only in that circuit which includes, in series, current-sensitive relay coil 94, the lamp 60 and the run-out switch 90. As noted before, with coil 94 energized, switch 96 in the warning circuit assumes an open position, and switch 98 assumes a closed position.

Under these conditons, if switch 102 of the light-detecting means closes, the coil 84 of the control relay is energized and the motor switch 82 is closed. Of course switch 102 is maintained in a normally open position due to an adequate amount of light being transmitted through the filter curtain from the light source and received by the cell of the photoelectric relay. However, as the filter curtain becomes increasingly dirty due to the filter curtain building up a dirt load, the light-transmitting quality of the filter curtain decreases. When the light transmission through the filter curtain is reduced to a predetermined level, the switch 102 moves to a closed position and the motor 54 is energized until that portion of the filter curtain which advances into a position between the light source and light-detecting means is sufficiently clean that the light transmitted to the photoelectric cell results in opening of switch 102.

It will be appreciated that the light-detecting means 62 as arranged is unable to discriminate between inadequate light transmission due, on the one hand to a burned-out lamp 60, and on the other hand to very dirty filter material. It is for this reason that the current-sensitive relay 88 is provided to signal when current ceases to flow through the coil 94 by opening switch 98 and closing switch 96. With switch 98 open, energization of the rewind motor 54 by closure of switch 102 in response to a reduction in light transmission below the predetermined level is prevented. At the same time that switch 98 opens, closure of switch 96 energizes the warning lamp 92.

It may be observed also that with the run-out switch 90 in series with both the light source and the light-detecting means, when the filter material is exhausted from the supply roll automatic energization of the motor is precluded, and the warning lamp 92 automatically lights.

Some of the more subtle features of the described arrangement are believed worthy of further explanation to assure complete appreciation. It will be noted that the light source 60 and light-detecting means 62 are shown as being disposed relatively closely to the entry aperture 32 of the air stream. This is a deliberate positioning and results in relatively small increments of material being advanced into the air stream upon energization of the drive motor. For purposes of the present apparatus, it may be said that it is preferred that the light source and light-detecting means be located closer to the entry aperture of the air stream than to the exit aperture. The usefulness of the system is not precluded if the light source and light-detecting means are located relatively close to the exit aperture, but in such a case each time the drive motor is energized it may be expected that almost the entire length of filter curtain in the air stream will be renewed each time. The renewal of the whole filter curtain at once has not generally been the most advantageous arrangement in past experience, and it is difficult, as a practical matter, to avoid this result if the light source and light-detecting means are located near the exit aperture.

It is also noted that the light source 60 is preferably disposed on the downstream side of the filter curtain, and is arranged with the globe 64 disposed with its upstream surface bearing against the downstream surface of the filter curtain. Thus, each time the filter curtain is moved it wipes the upstream surface of the globe. This prevents an inordinate dirtying of that part of the globe between the light source and light-detecting means.

It will be further noted that both the light source and the light detecting means are shown as not only being adjustable, but as being adjustable independently of each other. They may be adjusted together in a vertical direction so as to vary the increment of filter curtain which will be advanced into the air stream each time that the motor is energized in accordance with the anticipated dirt load that the filter curtain is to handle. Beyond this adjustment, they may be adjusted relative to each other (i.e., one may be lowered, and the other raised, or their axes may be moved out of alignment) to obtain an effective adjustment of light intensity. This latter adjustability feature permits using relatively inexpensive components in many applications. In this respect, while the intensity of the light source may very well be controlled by providing a rheostat in series with the light source, the same result may effectively be obtained by moving or turning the light source relative to the light-detecting means. By the same token, the less expensive photoelectric relay of the non-adjustable type may be readily used in the arrangement.

The appended claims do not encompass all of the subject matter disclosed herein since parts thereof are claimed in a co-pending Holtman application, Ser. No. 376,743, filed June 22, 1964, now abandoned, and assigned to the same assignee.

I claim:

1. In an air filtering apparatus including a filter media supply roll to receive a roll of filter media, a filter media take up roll to receive filter media from said supply roll, an air filtering zone disposed between said supply roll and said take up roll, and filter media extending from said media supply roll zone through said air filter zone to said filter media take-up roll so air to be treated passes through said filter media in said air filter zone, an air filter media advance control system in which the advance of said media from said supply roll to said take-up roll is initiated upon reduction in light transmitting quality of said media including:

an electric light source of controlled intensity disposed on one side of filter media, and light-responsive means disposed on an opposite side of said filter media from said light source for controlling said curtain advance;

an electrical motor drivingly connected to said take-up roll to effect the advance of said media;

an energizing circuit to energize said motor to drive said take-up roll including normally open first switch means and normally open second switch means;

said first switch means being operable to a closed position in response to a reduction in light received by said light-responsive means below a predetermined value; and said second switch means being operable to a closed position in response to energization of said light source wherein said motor is energized when said first switch and said second switch are in closed position.

2. The control system of claim 1 wherein:

said second switch means responsive to the energization of said light source is controlled by a current-sensitive relay means having current-sensitive coil in series with said light source.

3. The control system of claim 2 in which:

said current sensitive relay means includes, in addition to said second switch means in said energizing circuit, normally closed third switch means operable to a closed position energizing a warning circuit in response to a failure of current through said coil.

References Cited

UNITED STATES PATENTS

| | | |
|---|---|---|
| 1,882,962 | 10/1932 | Sawford. |
| 2,244,507 | 6/1941 | Thomas. |
| 2,710,574 | 6/1955 | Runion. |
| 3,102,014 | 8/1963 | Aitkenhead _____ 55—352 X |
| 3,157,915 | 11/1964 | Gilbo. |

FOREIGN PATENTS

| | | |
|---|---|---|
| 424,802 | 2/1935 | Great Britain. |

OTHER REFERENCES

Cambridge Auto Roll Bulletin 155 B, Cambridge Filter Corporation, Syracuse, N.Y., 8 pages, copyright 1963.

HARRY B. THORNTON, *Primary Examiner.*

D. TALBERT, *Assistant Examiner.*